Jan. 6, 1970     H. J. R. BINKLEY     3,487,589

CUTOFF WHEEL

Filed Jan. 30, 1967

United States Patent Office 3,487,589
Patented Jan. 6, 1970

---

3,487,589
CUTOFF WHEEL
Howard J. R. Binkley, North Tonawanda, N.Y., assignor, by mesne assignments, to Federal-Mogul Corporation, Southfield, Mich., a corporation of Michigan
Filed Jan. 30, 1967, Ser. No. 612,538
Int. Cl. B24d 5/04, 7/04
U.S. Cl. 51—206                                        4 Claims

ABSTRACT OF THE DISCLOSURE

There is disclosed a cutoff wheel having lateral reinforcing of open mesh fabric wherein the warp and the weft consist essentially of substantially flat fiber glass roving with substantially no twist and ply.

BACKGROUND OF THE INVENTION

In the U.S. Patent No. 2,814,918, to Erickson there is disclosed a fiber glass reinforced cutoff wheel. This wheel in general comprises a core disk consisting essentially of a mass of bonding and abrasive material. On each side of the core disk and bonded thereto is a reinforcing disk of open mesh glass cloth woven of threads of continuous filament glass yarn. Generally the mass of bonding and abrasive material extends outwardly into said mesh openings and thereat is exposed as well as at the periphery of the wheel.

While cutoff wheels of this construction have worked reasonably well, they have a higher than desirable wear in metal cutting service.

An object of this invention is to provide a generally improved and more satisfactory fiber glass reinforced cutoff wheel.

Another object of this invention is to provide a fiber glass reinforced cutoff wheel of this kind with improved resistance to wear when employed in the cutting of metal.

BRIEF DESCRIPTION OF DRAWING

These and other desirable objects may be attained in the manner disclosed as an illustrative embodiment of the invention in the following description and in the accompanying drawings forming a part hereof, in which.

DESCRIPTION OF A PREFERRED SPECIFIC EMBODIMENT

Figure 1:
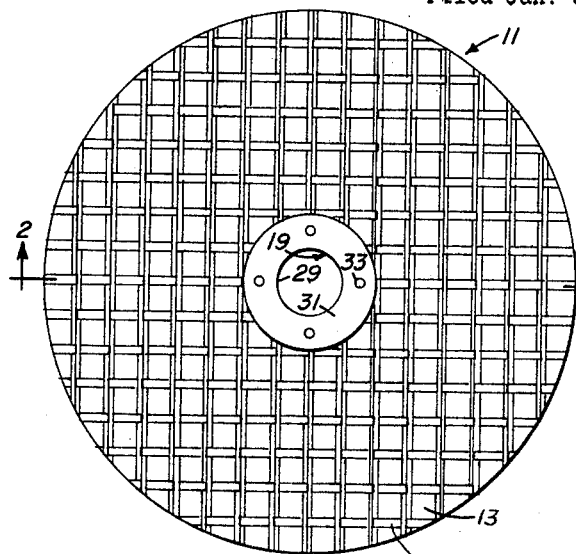
FIG. 1 is a side view of a preferred specific embodiment of a cutoff wheel of this invention.
Figure 2:
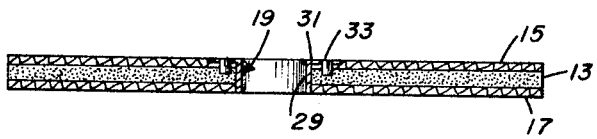
FIG. 2 is a somewhat schematic cross sectional view taken as indicated by the sectioning plane 2—2 in FIG. 1.

In greater detail, FIGS. 1 and 2 disclose a cutoff wheel 11 comprising a core disk 13, a pair of glass fiber reinforcing disks 15 and 17, and a hub 19.

The core disk 13 consists essentially of normally solid bonding and abrasive material. General and specific examples of such material are well known, are disclosed and discussed in the Erickson patent, the pertinent disclosures of which are incorporated herein by reference, and, therefore, need not be described further herein. Generally the mass of bonding and abrasive material extends outwardly into the openings of the lateral reinforcing disks 15 and 17 and is exposed thereat as well as at the circumference of the wheel.

Figure 3:
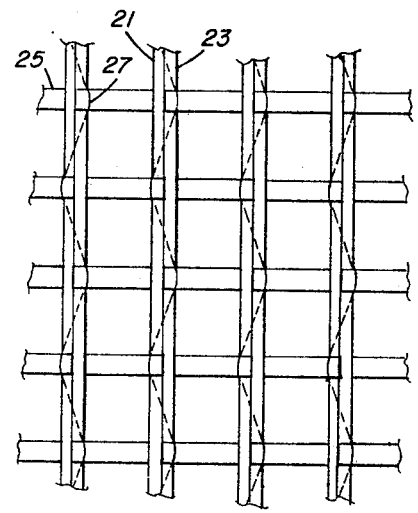
FIG. 3 is an enlarged plan view of a typical section of the fiber glass fabric in the cutoff wheel of FIG. 1.

Each one of the reinforcing disks 15 and 17 is an open mesh fabric woven of glass fiber roving in both the warp and weft directions. Roving, as the term is employed in the fiber glass fabric art, defines an untwisted and nonplied bundle of continuous fibers or filaments of glass. Roving is distinguished from thread in that normally thread comprises a twisted bundle of glass filaments. In a preferred embodiment of the glass fabric of this invention, shown in FIG. 3, each warp unit comprises a pair of rovings 21 and 23 positioned substantially edge to edge so as to lie substantially flat, and, interlacing each weft or fill unit 25 which comprises a single roving. In this embodiment, each warp unit is interlocked with a thread 27 having a diameter at most equal to the thickness from one side to the other of the thickest roving employed in each warp unit. An example of such a thread is 300 denier rayon thread. A purpose of the thread is to maintain the spacing of the warp and weft during treatment and processing of the fabric prior to its incorporation into the cutoff wheel of this invention. In other embodiments this interlocking thread is not present. The fabric is supplied in most instances with the roving coated with a resin compatible binder, whereby all that remains to be done with it is to assemble it with the core disk material and form the cutoff wheel. Preferably the glass fiber fabric has 2–10 openings per inch in the direction of the warp and in the direction of the weft, and preferably the glass fiber fabric has a tensile strength of at least about 100 pounds per inch of width both in the warp and in the weft directions.

The hub 19, located at the center of the cutoff wheel 11, in the embodiment shown has a conventional structure comprising a cylinder 29 with an outwardly extending annular flange 31 at one end thereof.

The reinforcing disks 15 and 17 are integral with the core disk 13, being usually joined thereto by bonding material in the core disk. The hub 19 is secured to the core disk 13 by staking as at 33.

The cutoff wheel 11 of this invention is made by conventional procedures. In this connection the general and specific disclosures appearing in the Erickson patent and relating to making a cutoff wheel are incorporated herein by reference, but substituting for the reinforcing disks disclosed therein the reinforcing disks 15 and 17 of this invention.

The cutoff wheel of this invention has substantially greater resistance to wear in metal cutting service than the cutoff wheel of the Erickson patent. Actual tests have provided some evidence in support of this. In one test a 16 inch by ⅛ inch by 1 inch cutoff wheel was made with a pair of lateral reinforcing disks of plain weave glass cloth woven out of glass fiber threads and having 5 openings per inch in each direction. Another 16 inch by ⅛ inch by 1 inch wheel was made from the same bonding and abrasive material, but employing as the lateral reinforcing disks glass fabric made out of roving, having the weave of FIG. 3, and 2 openings per inch in each direction. The total weight of the lateral reinforcing disks in each wheel was approximately the same. Each wheel was used three times to cut through two inch hot rolled steel, the rotational velocity of the free spinning wheel in each case being substantially the same with substantially the same cutting pressure being applied to each wheel in each cut. At the conclusion of the tests, it was reported that the cutoff wheel with the glass fiber fabric made from roving cut with much more ease and was worn only 12/32 of an inch as compared to the wear of 25/32 of an inch of the other wheel. In other words, in this test the other wheel was worn substantially twice as much as the cutoff wheel of this invention. Hence, on a basis of approximately equal weights of side reinforcing disks, the cutoff wheel of this invention represents a substantial improvement over the other cutoff wheel.

It is seen from the foregoing disclosure that the purposes of the invention are well fulfilled. It is to be understood that the disclosure is given by way of illustrative

What is claimed is:

1. A cutoff wheel of circular disk shape to be presented edgewise to work to be cut so that cutting is performed by the circumferential edge of the wheel and the lateral side faces of the wheel engage the sides of the cut being made, said wheel comprising a core disk consisting essentially of a mass of bonding and abrasive material, and on each lateral side face of said core disk a glass fiber fabric reinforcement layer bonded thereto, characterized by the improvement wherein said reinforcement layer is an open mesh fabric consisting essentially of glass fiber rovings arranged in a series of warp units and a series of weft units in crossing relation to the warp units, each separate roving unit having glass fibers which are essentially straight and parallel to each other and substantially free of twist relative to each other.

2. A cutoff wheel according to claim 1, wherein each warp unit of said fabric comprises a pair of substantially flat rovings positioned edge to edge.

3. A cutoff wheel according to claim 1, wherein each weft unit of said fabric comprises a single susbtantially flat roving.

4. A cutoff wheel according to claim 2, wherein said fabric has 2–10 openings per inch in both directions.

References Cited

UNITED STATES PATENTS

| | | | |
|---|---|---|---|
| 2,814,918 | 12/1957 | Erickson | 51—206 |
| 2,988,860 | 6/1961 | Sohl | 51—206 |
| 3,030,743 | 4/1962 | Raymond | 51—207 |
| 3,208,838 | 9/1965 | Fischer | 51—206 X |

HAROLD D. WHITEHEAD, Primary Examiner